Sept. 4, 1934.  H. BASCOM  1,972,416
DISPLAY APPARATUS
Filed June 15, 1932   6 Sheets-Sheet 1
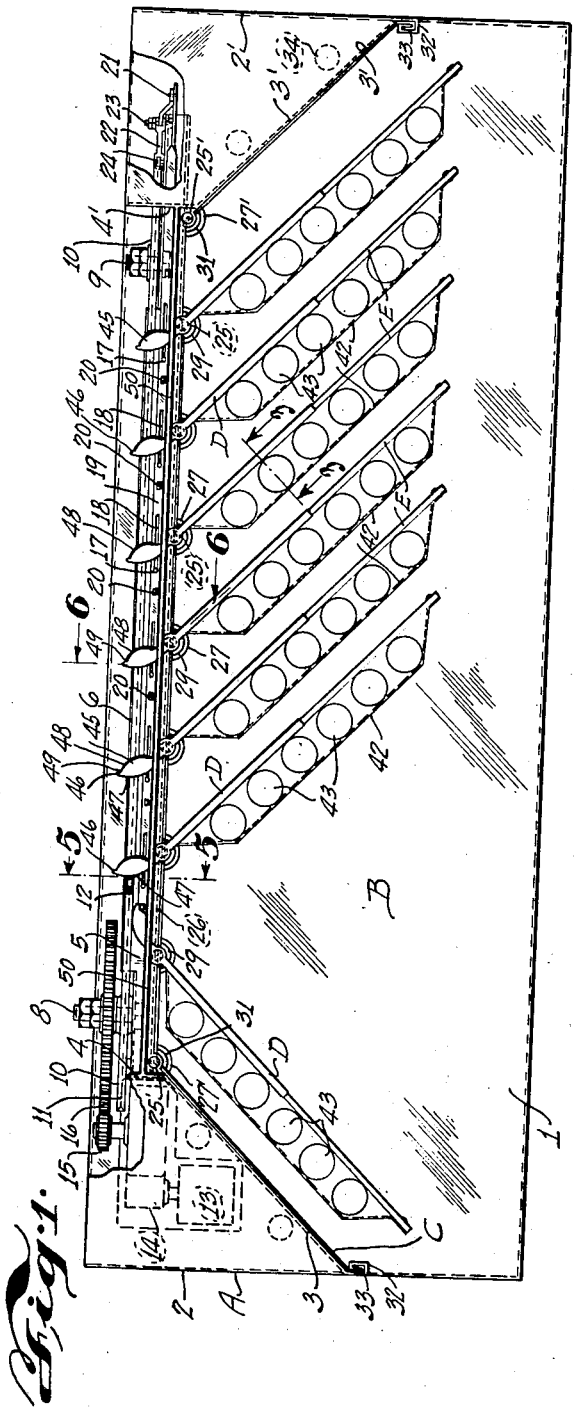
INVENTOR
Henry Bascom.
By Ralph Howson
ATTORNEY

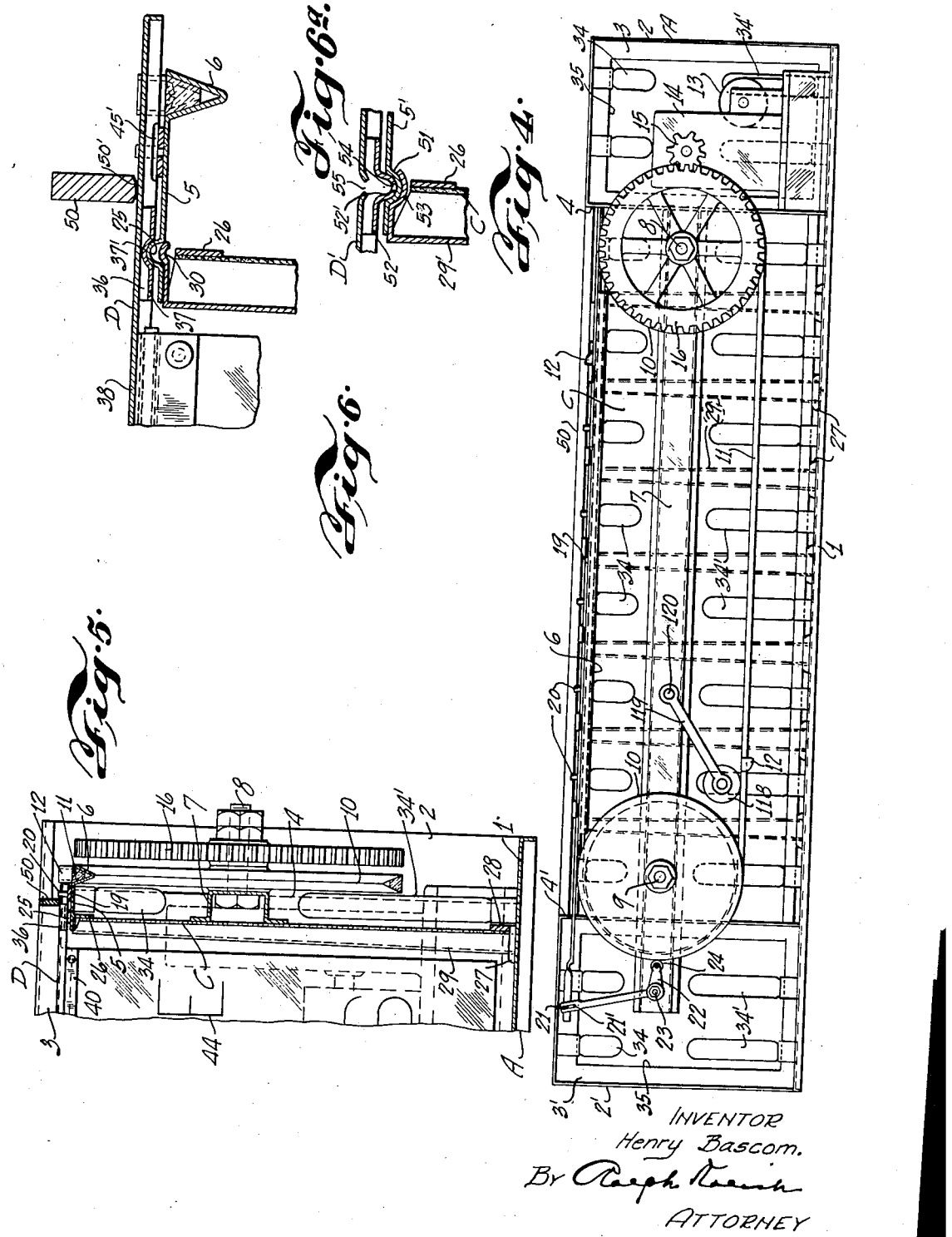

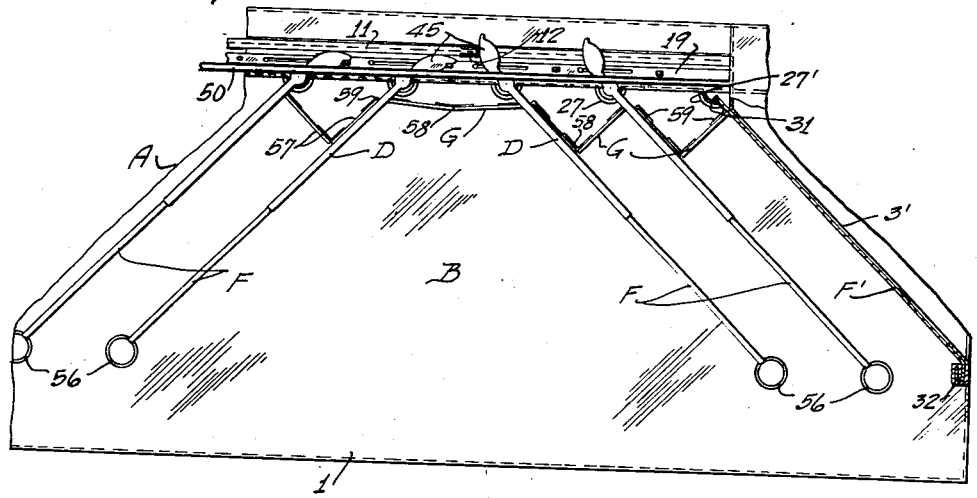
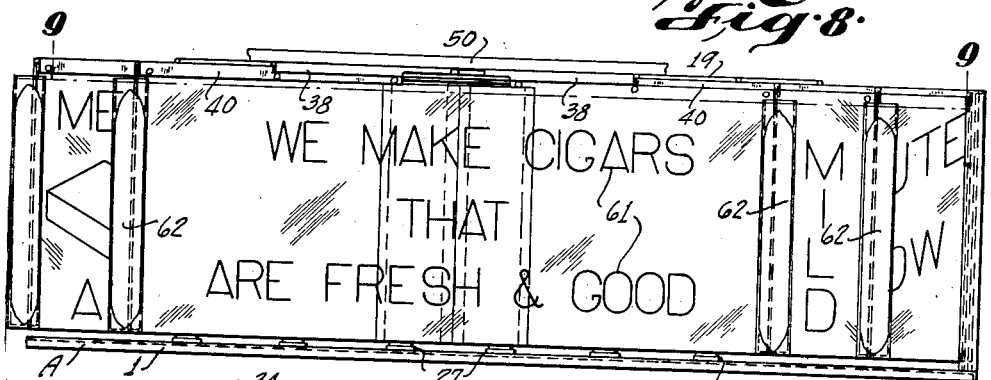
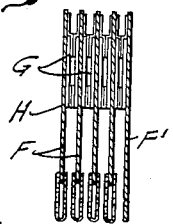

Sept. 4, 1934.    H. BASCOM    1,972,416
DISPLAY APPARATUS
Filed June 15, 1932    6 Sheets-Sheet 4
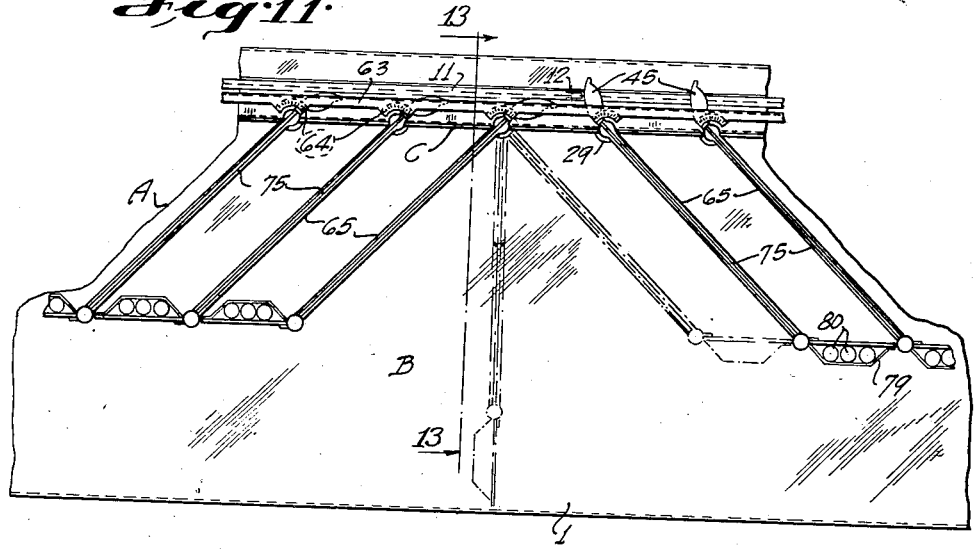
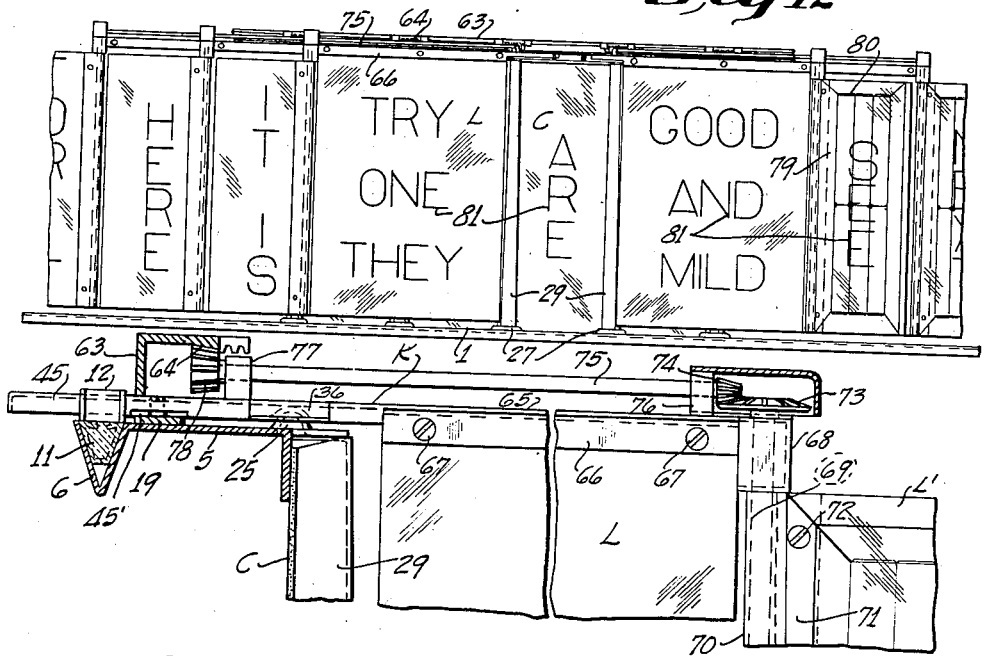

Sept. 4, 1934.   H. BASCOM   1,972,416
DISPLAY APPARATUS
Filed June 15, 1932   6 Sheets-Sheet 5
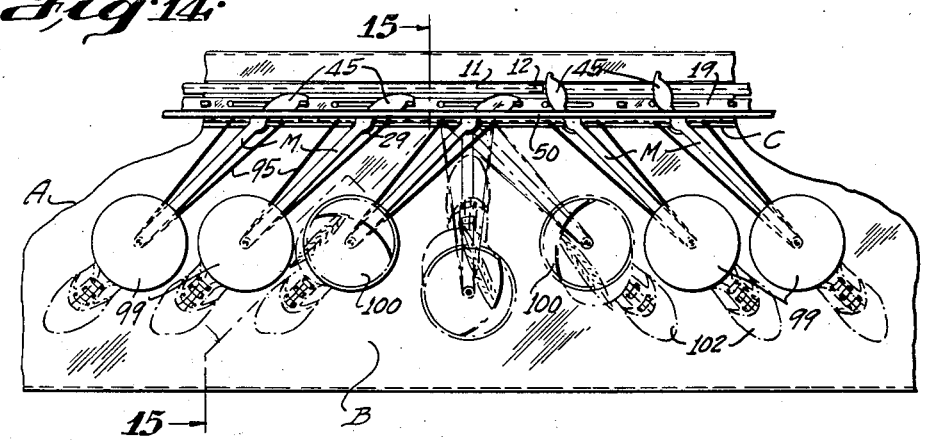
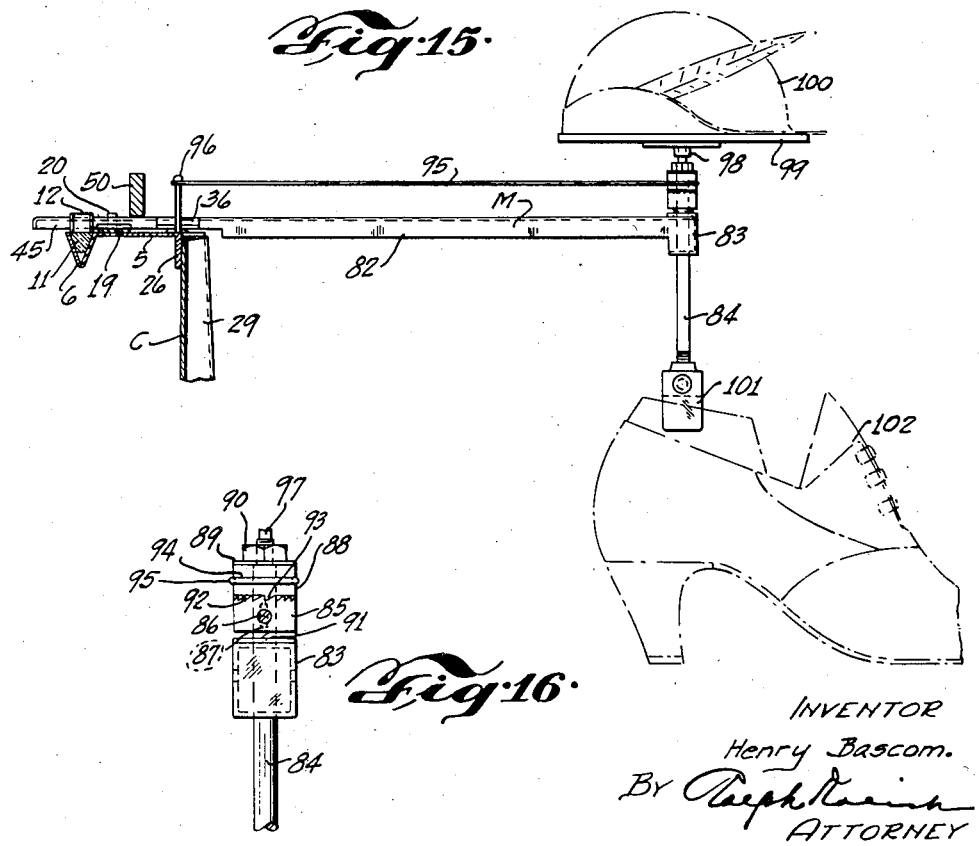
INVENTOR
Henry Bascom.
By Ralph ...
ATTORNEY Sept. 4, 1934.                H. BASCOM                1,972,416
                          DISPLAY APPARATUS
                    Filed June 15, 1932     6 Sheets-Sheet 6
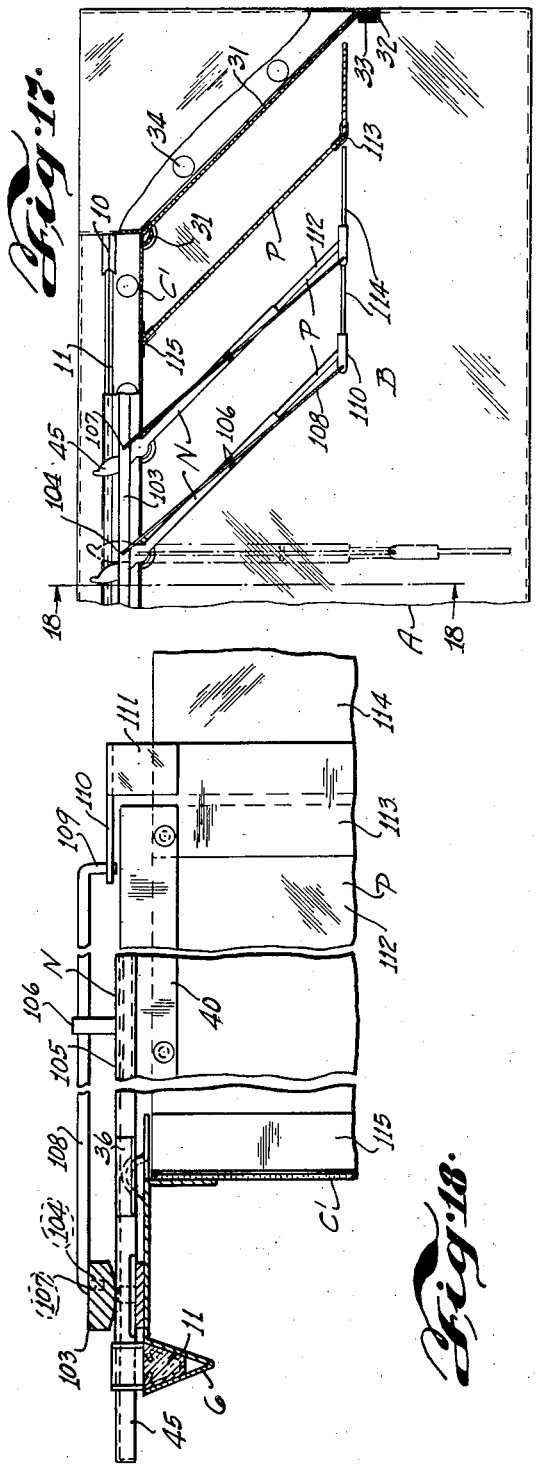
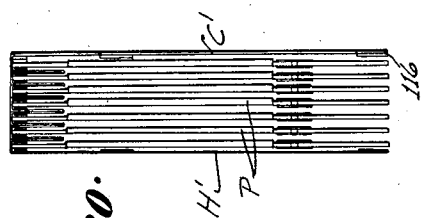
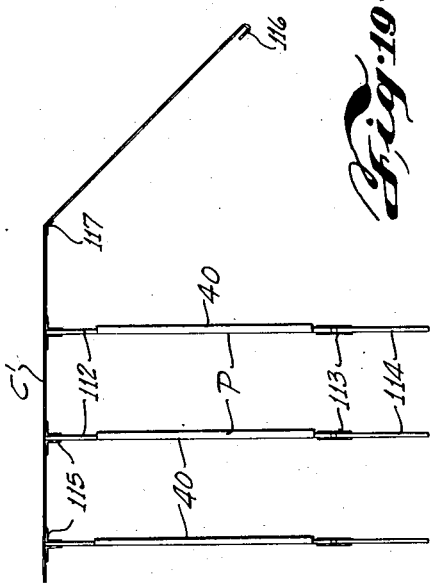
INVENTOR
Henry Bascom.
By [signature]
ATTORNEY Patented Sept. 4, 1934

1,972,416

UNITED STATES PATENT OFFICE 1,972,416

DISPLAY APPARATUS

Henry Bascom, St. Louis, Mo., assignor of thirty per cent to Roy Fred Toelke, St. Louis, Mo.

Application June 15, 1932, Serial No. 617,266

30 Claims. (Cl. 40—104)

This invention relates generally to display apparatus and has more particular reference to display apparatus of the oscillatory wing type.

My present invention has for an object the provision, in a display apparatus of the type stated, of a plurality of display-members or wings and a like plurality of pivotally mounted display-carriers normally arranged obliquely in a row in overlapping spaced relation and adapted for swingable actuation into oppositely oblique overlapping spaced relation for splaying their carried wings in pairs successively along the row.

My invention has for another object the provision, in such described display apparatus, of a display-cabinet providing a display chamber, and back-ground providing means including a removable wall-member adapted for mounting across the back and ends of the chamber and means for detachably supporting the wall member in the chamber.

My invention has for still another object the provision, in a display apparatus of the type stated, of a novel wing construction including a swingable principal wing member and a supplementary or flap-wing member swingable in turn relatively to the principal wing-member, and means responsive to swinging actuation of the principal wing-member for likewise swinging the flap-member relatively thereto.

My invention has for a further object the provision, in a display apparatus of the type stated, of a display-carrier incorporating means for supporting the articles to be displayed and means responsive to swinging actuation of the carrier for likewise turning or rotating the displayed articles simultaneously with swinging movement of the carrier.

My invention has for a still further object the provision, in such display apparatus, of display means including wing member supporting containers having transparent walls for visual presentation of the container contents, said containers being supported swingably by and with the wing-members.

My invention has for still another further object the provision, in a display apparatus including wing-carriers of the type stated, of a series of apice-connected wing-members foldable into a compact or package-form for shipping purposes and expansible for mounting in and on the carriers of the apparatus.

And with the above and other objects in view, my invention resides in the novel features of form, construction, arrangement and combination of parts hereinafter described and pointed out in the claims.

In the accompanying drawings (six sheets),—

Figure 1 is a top plan view of a display apparatus of my invention;

Figure 2 is a fragmentary front elevational view of an end-portion of the apparatus;

Figure 3 is a fragmentary sectional view through the upper portion of a display-wing and the swingable wing-supporting carrier, taken approximately along the line 3—3, Figure 1;

Figure 4 is a rear elevational view of the apparatus;

Figure 5 is a fragmentary vertical sectional view taken approximately along the line 5—5, Figure 1;

Figure 6 is a fragmentary sectional view of the wing-carrier actuating mechanism, taken approximately along the line 6—6, Figure 1;

Figure 6ª is an enlarged fragmentary sectional view of a modified form of carrier pintle construction;

Figure 7 is a fragmentary top plan view of a modified form of display apparatus of my invention;

Figure 8 is a fragmentary front elevational view of the apparatus of Figure 7;

Figure 9 is a reduced fragmentary sectional view taken approximately along the line 9—9, Figure 7, showing the apice-connected series of display members in expanded relation;

Figure 10 is a reduced fragmentary sectional view of the series of apice connected display members of Figure 9, as appearing when removed from the machine and folded and flatwise collapsed compactly together;

Figure 11 is a fragmentary top-plan view of another modified form of display apparatus of my invention, an initial and intermediately swung positions of one of the swingable carriers and its supported display members being shown by dot-dash lines;

Fig. 12 is a fragmentary front elevational view of the apparatus of Figure 11;

Figure 13 is a fragmentary vertical sectional view of the upper portion of the apparatus taken approximately along the line 13—13, Figure 11;

Figure 14 is a fragmentary top-plan view of still another modified form of display apparatus of my invention, the objects displayed, and an initial and intermediately swung position of one of the display carriers and its displayed article being shown in dot-dash lines;

Figure 15 is a fragmentary vertical sectional view taken approximately along the line 15—15, Figure 14, the displayed articles being indicated by dot-dash lines, Figure 16 is a fragmentary front view of one of the display-carriers showing the ratchet-mechanism thereof, other parts being omitted;

Figure 17 is a fragmentary top plan view partly in section of a further modified form of display apparatus of my invention;

Figure 18 is a fragmentary vertical sectional view of the upper portion of such apparatus, taken approximately along the line 18—18, Figure 17;

Figure 19 is a fragmentary top-plan view of the apice or back-wall connected series of display-members of Figure 17, as appearing removed from the machine, the series of display-members being shown in expanded relation; and Figure 20 is a view of the series of display members of Figure 19, as appearing in collapsed or compacted relation.

Referring now more in detail and by reference characters to the drawings, which illustrate practical embodiments of my invention, A designates a display cabinet providing a display chamber B open at its top and front sides, the cabinet A including a base 1 preferably rectangular in plan and forming in part the bottom wall of the chamber B.

The base 1 is provided at its opposite rear corners with upstanding box-like housings 2, 2', respectively, having their also respective front walls 3, 3', diagonally disposed across the rear corners of the base 1, forming oppositely splayed side-closures for the display-chamber B, the inner side walls of the housings 2, 2', forming respective jambs 4, 4', spaced longitudinally of the rear side of the chamber B.

Supported by and between the upper-portions of the jambs 4, 4', is a horizontal carrier-support or bridge-member 5 provided along its rear margin with a longitudinally depending V-shaped way or channel 6.

Disposed intermediate the base 1 and bridge-member 5, is a channel-shaped girder member or beam 7 longitudinally spanning between the jambs 4, 4'; one end of the girder 7 is secured to and abuts the jamb 4 and the other end of the girder 7 is secured to the jamb 4' and extends therethrough for projecting endwise into the enclosure 2', as best seen in Figure 4.

Mounted on the girder 7, is a pair of rearwardly projecting stub shafts 8, 9, the shaft 8 being disposed adjacent the jamb 4 and the shaft 9 adjacent the jamb 4'. Rotarily supported by the shafts 8, 9, are respective sheave or belt-wheels 10 provided with circumferential V-grooves having top-tangential alignment with the way 6, and trained over the wheels 10 for slidingly engaging its top-strand in the way 6, is an endless V-belt 11 carrying a pair of equally-spaced dogs or tripper-members 12, as best seen in Figure 4.

Suitably mounted in the enclosure 2, is a motor 13 having operative connection with a suitable speed-reducer 14 or the like, the reducer slow-speed pinion 15 meshing with a gear 16 rotarily supported also on the stub-shaft 8 and having operative preferably hub-wise connection with the particular sheave 10 thereon for, on actuation of the motor 13, effecting suitable slow-speed operation of the belt 11, the top run of the belt then moving in the groove 6 for traversing the belt-carried dogs 12 in a direction from the jamb 4 towards the jamb 4'.

The lower run of the belt 11 is engaged by a weighted pulley 118 rotarily mounted on arms 119 pivotally supported as at 120 from the girder 7 for tensioning the belt 11, as best seen in Figure 4.

Upstanding from the bridge member 5, is a series of studs or guide pins 17, the series of pins 17 being spaced forwardly on the bridge-member 5 from and parallel with the way 6. Mounted for longitudinal reciprocation on the bridge-member 5, and having a series of slots 18 each working over a respective pin 17, is a wing-shifter-bar 19, as best seen in Figure 1.

The shifter-bar 19 is provided with a series of upstanding shifter-dogs or lugs 20, the lugs 20 being equal in number and spacing to the guide pins 17, as best seen also in Figure 1.

The shifter bar 19 projects through the jamb 4' into the housing 2' and is actuated by means more fully described in my co-pending application for patent for Display-sign, Serial No. 575,009, filed November 14, 1931, briefly, it may here be said that the bar 19 is provided at its said housing-contained end with a transverse pin 21 working in a suitable slot 21' provided in the vertical arm of a bell-crank 22 pivotally supported as at 23 on the adjacent end of the girder 7, the horizontal arm of the bell-crank 22 being presented toward the particular wheel 10 on the shaft 9, and carrying a roller 24 for successive engagement by the belt-carried dogs 12 as the latter traverse the periphery of the particular wheel 10, as best seen in Figure 4.

On such engagement of the roller 24 by a dog 12, the bar 19 is shifted on the bridge-member 5 in a direction from the jamb 4' toward the jamb 4, that is, oppositely to the movement of the belt 11, the bar 19 being subsequently returned to initial position in a manner presently appearing.

Along its front margin, the bridge member 5 is provided with a longitudinally spaced series of hollow hemi-spherical knobs 25, 25', open at their bottom side and preferably integrally formed or upraised from the body of the bridge member 5. The knobs 25 are the intermediate ones of the row and are employed as pivots or pintles for display-carrier supporting purposes as will soon appear, the knobs 25 being equal in number and spacing to that of the lugs 20 on the shifter bar 19.

The knobs 25' are the end ones of the series and are disposed closely adjacent the jambs 4, 4', respectively, being similar to the knobs 25 though not employed specifically for carrier-supporting purposes.

Disposed in approximate vertical registration with the longitudinal axis of the series of knobs 25, 25', is a vertical flange or upper wall-support 26 depending from the bridge-member 5.

Mounted on the base 1 between the jambs 4, 4', is a series of longitudinally spaced intermediate and end socket members or bases 27, 27', respectively, the sockets 27 being substantially semi-circular in plan and disposed each in vertical registration with a respective pintle-knob 25, while the sockets 27' are shaped for fitting closely adjacent the respective jambs 4, 4', in vertical registration with the also respective knobs 25'.

Spanning across the rear portions of the series of socket members 27, 27', is a bar or lower wall support 28 connected also at its opposite ends to the respective jambs 4, 4', and disposed in vertical registration with the upper wall support 26.

Each of the sockets 27 is adapted to removably receive the lower end of a vertical semi-cylindrical ornamental column or pilaster 29, whose upper end is equipped with a rearwardly presented spring-finger or catch 30 for latching engagement with the cavity or socket formed on the underside of the corresponding knob 25, as best seen in Figure 6.

The rear face of the pilaster-column 29 terminates preferably in the approximate diametrical plane thereof, whereby each pilaster 29, when fitted with its opposite ends engaged as described respectively with and between the knob 25 and socket 27, will have its said rear face closely adjacent to the upper and lower wall supports 26, 28, respectively, although slightly spaced therefrom for purposes soon appearing.

In like manner, each of the sockets 27' is adapted to removably receive the lower end of a vertical corner pilaster 31, also provided with a spring finger carrying a catch for engaging the underside of the knob 25', the rear side of the pilaster 31 being formed with obliquely angled faces, one face being in parallel registration with the rear faces of the row of pilasters 29, and the other face being parallel to, although set a small distance outwardly from registration with, the adjacent oblique wall 3 or 3', as best seen in Figure 1.

Projecting forwardly from the front outer corner of each of the housings 2, 2', and forming preferably a continuation of the respective oblique walls 3, 3', thereof, is a vertical keeper-member 32 U-shaped in cross-section, and having its free margin vertically infolded providing a vertical also U-shaped interior channel 33, the channels 33 being adapted for respectively receiving the suitably folded opposite ends of a wall-strip C of suitable chamber-back-wall forming material, as paper, cloth, cellophane, and the like.

The wall-strip C is in width adapted for vertically spanning between the upper and lower wall-supports 26, 28, for residing between the same and the pilasters 29, as best seen in Figure 5. Thus, on removing the pilasters 29 and the corner-pilasters 31, and on foldably engaging the ends of the wall-strip C in the keeper channels 33, the strip C may be laid across the oblique chamber side-walls 3, 3', and likewise across the rear of the chamber B for engaging the supports 26, 28, between the jambs 4, 4'.

The corner-pilasters 31 may then be inserted into the respective corner-sockets 27' and snapped under the also respective corner knobs 25', whereby the pilasters 31 are pressed into the corners of the back-wall C for stretching the same on the end-walls 3, 3', and across the rear side of the cabinet chamber B, the intermediate pilasters 29 being then in like manner inserted into the respective sockets 27 and snapped under the knobs 25 for engaging the front face of the wall-strip C for thereby retaining the same between the pilasters 29 and the upper and lower wall supports 26, 28, as best seen in Figure 6.

Preferably the wall-strip C is of translucent material, and the same is transilluminated by means of suitable lamps 34, 34', respectively, the lamps 34 depending from the bridge member 5 rearwardly of the wall-support 26 and the lamps 34' upstanding from the base 1 in rear of the lower wall support 28, as best seen in Figure 4.

Also, for a like purpose, the chamber side walls 3, 3', are provided with cut-out portions 35, behind which are similar lamps 34, 34', the former depending from the top-wall of the respective housings 2, 2', and the latter upstanding from the base 1 therein, also as best seen in Figure 4.

Arranged for swingable actuation, each on and about a respective pintle-knob 25, is a series of display-carriers D, each comprising an inverted hollow channel-member intermediately widened for forming a hub-portion 36. Spanning the depending side flanges of the hub 36, is a transverse-plate 37 provided with a downwardly opening spherical-socket 37' having carrier-supporting pivotal or ball-and-socket engagement with the particular pintle-knob 25, as best seen in Figure 6.

Forwardly extending from the hub 36 of each carrier D, is a cantilever arm 38 projecting into the chamber B. The arm 38 is also of inverted channel section and has one depending side flange longitudinally inwardly and upwardly folded providing a U-shaped longitudinal channel 39, as best seen in Figure 3.

Adapted for support by and depending from the carriers D, are approximately rectangular wings or display-cards E, each provided along its upper margin with an upstanding preferably metallic strip or hanger 40. The upper margin of the hanger 40 is in turn longitudinally folded providing an inverted U-shaped flange 41 adapted for endwise sliding insertion into the arm-channel 39 for supporting the card E from the carrier D, as best seen in Figure 3.

Preferably, one or the reverse face of the card E is provided with a display container or bag 42 of transparent material as cellophane or the like, for containing articles 43, as cigars in the present instance, to be displayed.

On swinging actuation of a particular wing-card E in the chamber B, it will be seen that the obverse face of the particular card E will be presented to view while the reverse face of the next adjacent unswung card E will appear in splayed or widely spread apart relation to the swung card E, and the carriers D are spaced along the bridge-member 5 in such manner that, when a pair of the cards E are so spread apart, an intervening portion of the back-wall C will appear as a background to and between the spaced apices of the opposingly splayed cards E.

Suitable indicia, generally indicated at 44, are applied to the back-wall C and likewise to the obverse and reverse faces of the cards E so as to make sense to the observer of the so exposed indicia of any particular pair of splayed cards E and the portion of the back-wall C exposed therebetween, as best seen in Figure 2.

Rearwardly extending from the hub 36, is a combined cam and anchor arm 45 spaced upwardly from the bridge-member 5 for projecting over the shifter-bar 19 and normally also projecting approximately right-angularly over the belt 11 in the way 6. The arm 45 is more fully described in my co-pending application Serial No. 575,009, filed November 14, 1931; however, it may here be said, briefly, that in the present structure the arm 45 is in the form of an inverted channel-shaped or hollow member, as best seen in Figure 6.

As described in my said co-pending application, the arm 45 is of a generally uncinate contour, and comprises a bill 46 upon whose convex-side a depending flange provides a cam-face 47 suitably shaped for wiping co-operation with the dog 12, for effecting approximately 90 degree swinging movement of the arm 45 laterally to a side of and from the course of the belt 11.

On its concave side, the arm 45 has a depending flange which provides an arcuate cam-lobe 48 merging throatwise into the bill 46 with a reentrant pocket 49, the several cams 48 being disposed for swingable actuation in the path of movement of the shifter-bar 19 for co-operation with the respective lugs 20 thereof, the shifter-bar 19 being likewise normally disposed for positioning its respective shifter-lugs 20 in spaced relation with respect to the also normal position of the arms 45, whereby, on belt-dog-actuated movement of an arm 45, the bill 46 thereof will throatwise receptively impinge the particular lug 20 in operative adjacence thereto, all as best seen in Figure 1.

Thus, when the dog 12 has finished its traverse of the bridge-member 5, the series of arms 45 will have been swung each a quarter-turn for then residing in engagement with respective lugs 20 on the bar 19. The dog 12, then continuing its movement around the periphery of the adjacent or right-hand sheave 10, reference being had to Figure 1, will engage the bell-crank 22 for shifting the bar 19 toward the left, whereby the series of lugs 20 in engagement with the respective cam-lobes 48, shift or swing the series of arms 45 simultaneously also toward the left, that is, in counter-clockwise direction, for restoring the same to their initial position, the lugs 20, however, being in engagement with the cam-lobes 48 at the end of the stroke of the shifter-bar 19.

Then, as the next succeeding dog 12 rises over the left-hand sheave 10, reference again being made to Figure 1, the dog will initially engage the arm 45 at the left-hand end of the series thereof for turning said arm 45 as described, the ensuing lateral swinging movement of said end arm 45 causing the cam-lobe 48 thereof to coact with its engaged lug 20 for longitudinally reversely shifting or restoring the bar 19 to its initial position, this particular lug 20 lodging in the pocket 49 of the end arm 45, and all the other lugs 20 on the bar 19 departing from the remaining arms of the series, as best seen also in Figure 1, and as more fully described in my said co-pending application.

As a further improvement on the construction disclosed in my co-pending application Serial No. 575,009, however, I provide a hold-down bar or beam 50, mounted between the jambs 4, 4', rearwardly of the series of pintle-knobs 25, for frictional engagement of the under face of the hold-down 50 with the series of arms 45, whereby the carriers D are both retained frictionally in their particular swung positions and likewise slidingly engaged or counterbalanced for cantilevering the carriers D projectingly in the chamber B.

In use and operation, the motor 13 being suitably actuated, assume that a particular dog 12 has completed engagement with the bell-crank 22 for actuating the shifter-bar 19 to extreme right-hand position, reference being had to Figure 1, the display carriers D being then all swung counter-clockwise on their pintles 25 for disposing the display-cards E in normal or reverted position obliquely toward the right-hand chamber end-wall 3', with the carrier-arms 45 overlapping the belt 11, and the bar-carried lugs 20 being in engagement with the respective cam-lobes 48 of the several arms 45.

The card E adjacent the opposite or left-hand chamber-end wall 3 will then be widely spaced or splayed therefrom for visually presenting from the front of the apparatus, and in rearwardly converging manner, the reverse or bag-carrying face of the wall-adjacent card E and likewise that portion of the wall C residing across the oblique-wall 3 as well as the portion of the wall C intervening between the corner pilaster 31 and its next adjacent intermediate pilaster 29.

Meanwhile, the belt 11 brings the next particular dog 12 into initial engagement with the arm 45 of the wall-adjacent carrier D for swinging the same through an angle of 90 degrees, more or less, thereby also returning the bar 19 to initial right-hand shifted position as hereinbefore described.

The card E supported by the particular carrier D is thus turned or oppositely splayed from its former position for then visually presenting its obverse face to the spectator, the card E then residing in overlapping relation with the splay-wall 3 for substantially concealing from view the portions of the wall C on the wall 3 and between the corner-pilaster 31 and its adjacent pilaster 29.

There is now also visually presented the reverse face of the next adjacent card E and likewise the portion of the wall C intervening the apices of the splayed pair of cards E, that is, between the two pilasters 29 then exposed at the inner ends of the particular pair of splayed cards E, all as clearly seen in Figure 2.

Inasmuch as the belt 11 has preferably a uniform motion, a certain interval of time will elapse between successive engagements of the dog 12 with the respective arms 45, thus the carriers D are intermittently turned or swingably actuated in sequence from one or the left-hand end of the chamber B to the other or right-hand end thereof, for thereby one by one obverting the series of carrier-supported cards E for successively splaying the cards in pairs sequentially along the row thereof, that is, across the width of the chamber B.

On completion of its carrier-turning traverse of the bridge-member 5, the particular dog 12 descends over the right-hand sheave 10 and then, engaging the roller 24 of the bell-crank 22, actuates the latter for shifting the bar 19 again to left-hand position, the shifter-lugs 20 engaging the cam-lobes 48 of the respective arms 45 for simultaneously reverting all the carriers D and their supported cards E to their initial or first described position for repetition, on recurrence of the next successive dog 12 in the way 6, of the carrier-and-card obverting sequence.

In the practical use of my invention, a carrier D may be dismounted from the machine by merely inclining or canting the carrier for lifting the hub-plate 37 for disengaging the socket 37' from the pintle-knob 25, the lower face of the hold-down 50 being suitably rounded, as at 50', and the side-flanges of the uncinate-arm 45 having notches 45' for affording clearance for the bar 19 for permitting such canted or rocking movement of the carrier D, as will be understood from Figure 6.

The carrier D may then be yieldingly snapped over and to one side of the pintle knob 25 and with ease and facility withdrawn from between the hold-down 50 and bridge-member 5; and likewise, in similar but reverse manner, as will be understood, the arm may readily be replaced in the machine.

The user of the machine, it will be understood, may from time to time be supplied by the manufacturer with new sets of cards E and wall strip C, for replacing the old set in the machine for providing a changeable, up-to-date and attention compelling display of advertising material having suitable relation to matters of current interest, as news-matter, seasonal sales, or the like.

The new wall-strip C may be mounted in the machine as hereinbefore described after first removing the old wall-strip, and for mounting the replacement cards E in the machine, the old set is likewise first removed therefrom by sliding the individual cards of the set endwise from the respective carriers D, the new set of cards E being then in reverse manner with ease and facility inserted in the carriers D, as will readily be understood.

Figure 6ᵃ illustrates a modified form of carrier and pintle-knob construction including a bridge-member 5' similar in form and function to the member 5 except that the series of pintle-knobs 25 of the latter are in the member 5' replaced by a corresponding series of pintle-sockets 51, open at their upper side and depending from the bridge-member 5'.

Likewise the modified form of the carrier D' is similar in form and function to the carrier D except that the hub-plate 37 of the latter is in the carrier D' replaced by a hub-plate 52 having a depending hemi-spherical knob 52' having ball-and-socket co-operation with the socket 51 for swingably supporting the carrier D' on the bridge-member 5'.

The modified form of pilasters 29' are likewise similar in form and function to the pilasters 29 except that the spring catch 53 is adapted for co-operation with the now depending hemi-spherical wall of the socket 51.

The lower-wall of the knob 52' is provided with an axial aperture 54 and the top wall of the member D' is likewise provided with an aperture 55 preferably in registration with the aperture 54, whereby, in the modified construction of Figure 6ᵃ, the pintle of the carrier D' may with ease and convenience be most efficiently lubricated by dropping a suitable lubricant through the apertures 55 into the cavity of the knob 52' for feeding by gravity through the aperture 54 to the ball-and-socket joint 51—52'.

The modified form of carrier D' may be removed from the machine in the manner hereinbefore described for the carrier D, as will be readily understood.

Figures 7 to 10, inclusive, illustrate a second modified form of my invention including display-cards F, F', other parts of the machine being similar in form and function to those hereinbefore described and hence referenced with like characters wherever such parts appear in the drawings.

The display-cards F are each provided with a hanger 40, as heretofore, for supporting engagement with the projecting arm 38 of a carrier D. The former bag 42, however, is omitted from the card F' and in its place is substituted along the front vertical or free margin of the card a tubular bag or cylindrical display container 56 of transparent material.

A requisite number of cards F, equal to the number of carriers D of the particular display machine in question, together with additional end-cards F', are assembled into a foldably connected series, as will be understood from Figure 9. The cards F of the series are connected in pairs by means of foldable back-wall members G, each comprising a pair of panel sections 57 intermediately vertically hinged as at 58 and connected at their opposite sides by also vertical hinges 59 to the respective adjacent cards F', F, or F, F', of the particular pair, as the case may be.

The hinges 58, 59, are of suitable flexible fabric and are preferably mounted on the rear face of the panel-sections 57, the latter being set forwardly of the rear margins of the cards F, F'. This construction conveniently provides a marginal edge 60, more particularly for the end cards F', whereby the latter may be fitted each against a respective chamber end wall 3 or 3', as the case may be, for engagement of its margin 60 between the particular wall and a corner-pilaster 31, the front margin of the card F' being suitably scored or foldable for fitting into the channel 33 of the keeper-member 32, all as clearly shown in Figure 9.

As seen in Figure 9, the back-wall C and pilasters 29 are in the present instance unnecessary and hence omitted; also the back-wall sections G, and cards F and F', if desired, may be made of translucent material for transillumination by the lamps 34 and 34', the former only being shown in Figure 9.

As so constructed, the series of cards F, F', thus connected foldably at their apices by the wall-sections G, may, when detached fom the carriers D, be most conveniently folded or collapsed into a compact package or bundle H, as shown in Figure 10, whereby from time to time such packages H may be made up by the manufacturer and shipped with small expense to a user of the machine who in turn with ease and facility may mount the same in the machine in substantially the manner hereinbefore described for the cards E.

The use of the machine when carrying the cards F, F', is substantially as described for the machine when using the cards E, the cards F, F', and back-walls G, likewise carrying indicia, as 61, which, as the cards are splayed in pairs, conveys an intelligible message to the spectator, and the bags 56, similarly, may contain a sample of the article being advertised, as a cigar 62, all as clearly seen in Figure 8.

Figures 11 to 13, inclusive, illustrate a third modified form of my invention including a carrier K and display-cards including a principal wing or card L and a supplementary wing or flap-card L'; the machine also includes a modified form of hold-down 63, the other parts of the machine being similar in form and function to those hereinbefore described and hence referenced with like characters wherever such parts appear in the drawings.

The hold-down 63 is in the present instance set rearwardly over the shifter bar 19 and is of inverted angle-shape, the depending leg of the hold-down 63 having similar co-operation with the rear-arm 45 of the carrier K as described for the hold-down 50 and carrier D. The front margin of the upper or horizontal leg of the hold-down 63 is provided with a series of arcuate depending toothed portions as racks 64, each rack 64 being disposed opposite a respective pintle knob 25 of the bridge-member 5.

The carrier K is provided with the hub 36 and the rear arm 45 as heretofore described; however, in the present instance, the forward or chamber-projecting carrier arm 65 comprises a T-shaped member whose depending stem is formed of a pair of transversely spaced longitudinal flanges 66 providing a card-receptive channel therebetween, in which is removably inserted the upper margin of the principal wing card L, suitable fastening elements, as screws 67, passing through one flange 66 and card K and threaded into the other flange 66 serving for detachably securing the card L in the carrier K.

The front or free end of the arm 65 terminates in a hub 68 in and through which is rotarily supported a vertical wing pintle-shaft 69 depending in spaced registration with the front margin of the card L.

Secured to the depending portion of the shaft 69, is a sleeve 70 having a forwardly projecting vertical flange 71 on which, as by suitable fastening elements 72, is mounted the inner or rear margin of the supplementary or flap-card L', which projects forwardly from the shaft 69 for swingable actuation thereby, as will presently appear.

On the upper end of the shaft 69 is mounted a bevel-gear 73, which has meshing engagement with a bevel-gear 74, in turn mounted on the forward end of a shaft 75 longitudinally extending over the arm 65 and rotarily supported in and through suitable front and rear bearings 76, 77, upstanding respectively from front and rear portions of the carrier K. The rear end of the shaft 75 carries a bevel-pinion 78 having meshing co-operation with the particular rack 64 on the hold-down 63, all as best seen in Figure 13.

The respective carriers K are actuated for swinging movement in the display chamber B substantially in the manner and by the mechanism as hereinbefore described for the actuation of the carriers D.

However, it will be seen that, on such swinging actuation of each carrier K, the bevel-pinion 78 will co-operate with its particular engaged rack 64 for effecting rotatory movement of the shaft 75 for in turn through the meshing pair of bevel-gears 74, 73, effecting, in the present instance, a one-quarter turn of the flap-card L' on the carrier K while the latter likewise in the same direction makes a quarter turn on its pintle 25.

Thus, considering a carrier K and its card L in initially reverted or right-hand position at an angle of approximately 45 degrees to the right of mid-position thereof, the flap-card L' will be further swung to the right at an angle of 45 degrees from the carrier K, as shown by dot-dash lines in Figure 11.

As the carrier K is swung or turned towards the left, the flap-card L' is likewise and at the same angular speed turned towards the left with respect to the carrier K, so that, as the carrier K comes to mid-position, the card L' will be correspondingly turned into alignment with the carrier, also as shown by dot-dash lines in Figure 11.

Again, as the carrier K completes its left-hand swing to obverted position at an angle of approximately 45 degrees to the left of mid-position thereof, the flap-card L' will assume a position 45 degrees further to the left with respect to the carrier K, as shown in full lines also in Figure 11.

It will be seen that the actuation of the carriers K is substantially similar to the actuation of the carrier D as hereinbefore described, hence description thereof will not be here repeated. However, it will be noted that the cards L of the row residing on either or both sides of a particular splayed pair thereof will be in echelon, that is, in overlapping row-relation, and the width of the respective flap-cards L' is selected for nicely fitting between the end of its particular principal card L and the end of the next-adjacent card L, as best seen in Figure 11.

Thus the flap-cards L' are normally disposed parallel with the longitudinal axis of the chamber B for closing the gaps between the so-overlapping free or swingable ends of the unsplayed cards L of the row for concealing the latter from view, the flaps L' collectively, hence, providing a front wall, as may be said, for the chamber B, said front wall being interrupted by the particular pair of splayed cards L, between which a portion of the wall C will appear as a background, substantially as heretofore set forth with respect to the splayed cards E.

Both faces of the cards L are bare of display containers, while, on the other hand, one or the reverse face of each of the cards L' is provided with a bag or display container 79 of transparent material for containing the articles 80 to be advertised, as cigarettes, in the present instance, suitable indicia 81 being applied, however, to all the faces of the cards L and L' so as to be intelligible to the spectator of the exposed indicia of the display, as clearly shown also in Figure 12.

Figures 14 to 16, inclusive, illustrate a fourth modified form of my invention including display-carriers M, other parts of the machine being similar in form and function to those hereinbefore described and hence referenced with like characters wherever such parts appear in the drawings.

The display-carriers M are each provided with the hub 36 and rearward arm 45 as heretofore; the chamber-projecting arm 82 of the carrier M, however, comprises an inverted channel-shaped member terminating at its front or free end in a hub 83, in and through which is rotarily supported a vertical shaft 84.

Mounted on the upper hub-projecting end of the shaft 84 for rotation therewith, is a ratchet-collar 85 carrying a set-screw 86 whose inner end slidingly engages a longitudinal way 87 provided in the shaft 84 for axial shiftable movement of the collar 85 on the shaft 84.

The shaft 84 continues above the collar 85 for rotarily supporting a loosely-mounted pulley 88 freely rotatable on the shaft 84 and having its upper face bearing on a thrust-washer 89 retained on the shaft 84 by means of a nut 90 threaded thereon, a suitable friction spring washer 91 being interposed between the hub 83 and the collar 85 for biasing the latter on the superposed pulley 88.

On its upper face, the collar 85 is provided with an annular series of ratchet-teeth 92 and on its lower face the pulley 88 has a dog or tooth 93 for meshing co-operation with the series of teeth 92, whereby rotation of the pulley 88 in one or clockwise direction (viewed from the top thereof) will effect corresponding clockwise actuation of the collar 85 and shaft 84, while on counterclockwise rotation of the pulley 88 the dog 93 will ride over the teeth 92, meanwhile depressing the collar 85 on the spring 91, which latter also serves for frictionally retaining the collar 85 and shaft 84 against such counterclockwise rotation.

The pulley 88 is provided with a circumferential belt-groove 94 engaged on its front side by the bight of a rearwardly extending belt 95, U-shaped in plan and having its opposite ends connected to respective anchor-studs 96 upstanding from the front margin of the bridge-member 5. Each pair of anchor-studs 96 is disposed in the longitudinal axis of the pintles 25 and in equally spaced relation on the respective opposite sides of a particular pintle 25, as best seen in Figure 14.

At its upper end, the shaft 84 terminates in a reduced neck or portion 97 engaging a socket 98 of, and for hence supporting on the shaft 84, a preferably circular display table or disc 99 adapted for supporting for display an article or articles 100, as a hat, or the like, indicated by dot-dash lines in Figures 14 and 15.

Supported from the lower end of the portion of the shaft 84 depending from the hub 83, is a suitable form of clamping device or securing means 101, best seen in Figure 15, for supporting for display from said shaft 84 a second article or articles 102, as a shoe or shoes, indicated also by dot-dash lines in Figures 14 and 15.

In use and operation of such fourth modified form of my invention, the display carriers M are swung to-and-fro singly and together in the chamber B in substantially the manner and by the means hereinbefore set forth for the carriers D.

Considering a carrier M in its initially right-hand swung position, that is, at 45 degrees to the right of mid-position thereof, as indicated by dot-dash lines in Figure 14, it will be seen that the length of the strand of the belt 95 from the pulley 88 to the right-hand anchor-stud 96 is less than that of the strand of the belt from the pulley 88 to the left-hand anchor 96.

However, as the carrier moves through an angle of 45 degrees to mid-position, as also indicated by dot-dash lines in Figure 14, it will be observed that the lengths of the opposite strands of the belt 95 become equal, that is the left hand strand has shortened while the right-hand strand has lengthened, whereby the belt 95 is drawn over the pulley 88 for effecting rotation of the pulley 88 in clockwise direction for, in turn, effecting rotation of the shaft 84 in like direction, as described, the relative dimensions of the parts being such that, in the present instance, the shaft 84 will be rotated through an angle of 180 degrees with respect to the carrier M.

As the carrier M completes its movement to final left-hand position at an angle of 45 degrees to the left of mid-position thereof, reference being again made to Figure 14, the left-hand strand of the belt 95 becomes further shortened while its right-hand strand becomes further lengthened, whereby the belt 95 is, in turn, further drawn over the pulley 88 for effecting likewise further rotation of the pulley 88 in clockwise direction, the shaft 84 then being again turned through an angle of 180 degrees, or a total angular movement of 360 degrees from initial position, whereby the articles displayed are, during the described left-hand swinging movement of the carrier M, turned around a whole revolution, as best seen again in Figure 14.

However, when the carrier M is returned to initial or right-hand swung position, the left-hand strand of the belt 95 is then lengthened while its right-hand strand is correspondingly shortened for drawing the belt 95 over the pulley 88 in a manner reversely to that hereinbefore set forth, whereby the pulley 88 is rotated, again, an angular movement of 360 degrees, but in counter-clockwise direction, the pulley dog 93 then slipping over the collar-teeth 92 as described, and the shaft 84 hence remaining stationary on the carrier M as the same assumes its initial position.

Thus it will be seen that, as the several carriers M are swung successively toward the left, each particular article displayed on the respective carriers is likewise, and during the swing of its carrier, rotated an entire revolution, for thereby affording to the spectator a full and complete view of all sides of the article.

And further, it will be seen that when the entire series of carriers M is reversely swung to initial position, the articles do not turn or rotate on the carriers M, thereby avoiding interference of the articles one with another during such carrier reverting operation.

Figures 17 to 20, inclusive, illustrate a fifth modified form of my invention, including a carrier N and foldable display card P; the machine also includes a modified form of hold-down 103, the other parts of the apparatus being similar in form and function to those hereinbefore described and hence referenced with like characters wherever they appear.

The hold-down 103 is in the present instance set rearwardly over the shifter bar 19 and comprises a relatively flat rectangular member or bar having its under face similarly co-operating with the rear arm 45 of the carrier N as set forth for the hold-down 50 and carrier D.

On its upper face and along its front margin, the hold-down 103 is provided with a series of apertures 104 each disposed opposite a respective pintle knob 25 of the bridge-member 5, for a purpose soon appearing.

The carrier N is provided with a hub 36, and rear arm 45 as heretofore described; the chamber-projecting arm 105 of the carrier N is substantially similar in form and function to the arm 38 of the carrier D, and is additionally provided with a pair of upstanding transversely spaced yoke-pins 106 disposed approximately midway of the length of the arm 38, as best seen in Figures 17 and 18.

Having its rear hooked end suitably reduced as at 107 for pivotally residing in a particular aperture 104 of the hold-down 103, is a connecting-rod or flap-actuator 108 extending longitudinally the carrier N for slidingly guided movement between the yoke-pins 106. At its end, the flap-actuator 108 terminates in a depending pin 109 spaced forwardly from the end of the carrier-arm 38 and having pivotal engagement with the rear end of a crank-member or clip-arm 110 which, extending forwardly beyond the end of the actuator-pin 38, is there provided with a pair of depending transversely opposed spring fingers or clips 111, for a purpose soon appearing.

Each display member P comprises a principal wing-member or card-section 112 provided with a hanger 40 for detachable supporting engagement with the arm 105 of the carrier N, substantially as described for the mounting of the cards E on the carrier D, and having its rear vertical margin hinged as at 113 to the front vertical margin of the card-section 112, is a supplementary wing-member or flap-section 114 adapted for detachable engagement at its upper rear corner with and between the spring-clip fingers 111, with the arm 110 projecting rearwardly over the hinge 113, all as best seen in Figure 18.

A requisite number of the display-members P, equal to the number of carriers N of the display-machine, are respectively assembled, as by hinges 115, on a chamber-back wall strip C', which latter is similar in form and function to the strip C, heretofore described, the strip C' having its opposite end margins suitably pre-folded as at 116, however, for greater convenience in mounting the strip C' in the keeper-channels 33 of the cabinet A; also, at the corners of the chamber B, where the pilasters 31 engage the strip C', the latter is provided with reinforcing strips or hinges 117.

As so constructed, the several display-members P, thus connected foldably at their apices by the wall-strip C', may, when detached from the machine, be most conveniently folded or collapsed into a compact package or bundle H' having the same advantages and utility as heretofore set forth regarding the card-package H.

In the embodiment shown, the card-sections 112, 114, are bare of any display containers. However, it will be understood that such containers may be provided in any of the several forms hereinbefore described, and likewise the display-members P and back-wall C' may have such suitable attention compelling indicia as may best serve the intended purpose.

In use and operation of such fifth modification of my invention, the display members P are mounted in the particular carriers N substantially as described for mounting the cards E in the carriers D, and the wall-strip C' is mounted across the splayed end walls of the chamber B and likewise across the back thereof in the manner substantially as described for the wall-strip C, with the exception, however, that the pilasters 29 are unnecessary and hence in the present instance omitted.

The respective carriers N are actuated for swinging movement in the display chamber B substantially in the manner and by the mechanism as hereinbefore described for the actuation of the carriers D.

Considering a carrier N initially in reverted or right-hand position, reference being made to Figure 17, wherein such carrier N is shown approximately at an angle of 45 degrees from its mid-position, it will be seen that the flap 114 is then disposed at an angle of approximately 45 degrees farther to the right with respect to the carrier N, the flap 114 flexing, as will be understood, about its hinge 113.

The clip-arm 110 will hence project to the left of the hinge 113 of the flap 114 thus disposing the end 109 of the flap-actuator 108 likewise to the left of the axis of the carrier N. Contrariwise, by reason of the fact that the pivot-aperture 104 is located directly behind the carrier pintle 25, the inner end 107 of the actuator 108 is now disposed to the right of the axis of the carrier N, hence the flap-actuator is disposed as a whole obliquely across the axis of the carrier N, as clearly seen in Figure 17.

However, as the carrier N is swung to the left to mid-position thereof, it will be seen that the actuator 108, being restrained by the yoke-pins 106, is compelled to swivel on the arm 105 and to assume a position parallel with the carrier N, while at the same time shifting rearwardly with respect to the carrier-arm 105, thus causing the flap 114 to turn about its hinge 113 to a position parallel with the carrier N, as shown in Figure 18.

Then, as the carrier N swings further to the left to its final obverted position, the actuator 108 swinging between the yoke pins 106, is forwardly shifted relatively to the arm 105 and meanwhile takes a swivelled or oblique position crosswise of the carrier N, reversely to the actuator's initial position, thereby causing the flap 114 to flex to the left of the now also left-wise swung carrier N.

The relative dimensions and arrangement of the card-sections 112, 114, and their co-operation in the machine with each other and the back-wall C' for display purposes, as intended, are in form and function substantially similar to that set forth about the cards L, L', of the apparatus of Figures 11 to 13, hence further description thereof is here omitted.

My invention provides a unique and attention-attracting advertising apparatus highly effective for its intended purpose, simple and reliable in operation and inexpensive in construction and maintenance.

Among the salient features of my improved advertising display apparatus may be mentioned the following,—

The invention provides a display cabinet of universal application for the employment of interchangeable display fixtures of divers forms, constructions, and aspects.

The invention provides a display apparatus including means for swingably supporting and actuating removable display carriers in turn supporting replaceable displays, as indicia bearing cards, transparent article containers, article-supports and the like, of such several forms and constructions as may best serve a wide variety of advertising requirements.

My improved display apparatus is adapted for the employment of display devices including combination indicia-bearing and article displaying members, or combination swingable and rotary display-members, or sectional display members foldable one section with respect to the other, all as may best serve the intended purpose.

My invention further provides chamber wall members, and likewise, if desired, swingable display members, of translucent material and means for transilluminating such translucent members for enhancing the advertising utility and effectiveness of the device.

My improved apparatus further, again, provides a series of replaceable swingable display members foldably connected at their apices, whereby said series when removed from the machine may be collapsed flatwise into a compact package or shipping unit as described.

It will be understood other changes and modifications in the form, construction, arrangement, and combination of the several parts of the apparatus may be made and substituted for those herein shown and described without departing from the nature and principle of my invention.

Having thus described my invention, what I claim and desire to secure by Letters Patent is,—

1. In a display apparatus, the combination with a display chamber, of a continuous strip of wall-forming material for disposition across the side and rear portions of the chamber, and splayable display members hingedly connected to, and spaced at their apices for exposing the intervening portions of, the strip.

2. In a display apparatus, in combination, a row of oscillatory first display members arranged for splaying in pairs sequentially along the row, and second display means foldably connecting said first display members for visual presentation between the splayed pairs thereof.

3. In a display apparatus, in combination, a row of oscillatory display-carriers, first display members respectively supported by said carriers for actuation thereby for splaying the display members in pairs sequentially along the row, and foldable second display members connecting the apices of said first display members for unfolding actuation of the second members between the splayed pairs of the first members.

4. In a display apparatus, in combination, a series of oscillatory principal display wings normally arranged obliquely in overlapping row relation, and supplementary display wings swingably mounted for oscillation at the free margins of the respective principal wings for closing the gap therebetween.

5. In a display apparatus, in combination, a series of oscillatory principal display wings normally arranged obliquely in overlapping row relation, supplementary display wings swingably mounted for oscillation at the free margins of the respective principal wings, and swingable carriers for respectively supporting the principal wings and their supplementary wings in swingable relation.

6. In a display apparatus, in combination, a series of oscillatory principal display wings normally arranged obliquely in overlapping row relation, supplementary display wings swingably mounted for oscillation at the free margins of the respective principal wings, swingable carrier-members for respectively supporting the principal wings and their supplementary wings, and means for swingably actuating the supplementary wings relatively to the principal wings.

7. In a display apparatus, in combination, a series of oscillatory principal display wings normally arranged obliquely in overlapping row relation, supplementary display wings swingably mounted for oscillation at the free margins of the respective principal wings, swingable carriers for respectively supporting the principal wings and their supplementary wings, means for swingingly actuating said carriers, and means responsive to swinging actuation of the carriers for swingingly actuating the supplementary wings relatively to the principal wings.

8. In a display apparatus, in combination, a series of oscillatory principal display wings normally arranged obliquely in overlapping row relation, supplementary display wings swingably mounted for oscillation at the free margins of the respective principal wings, swingable carriers for respectively supporting the principal wings and means including pintle-shafts mounted on the carriers for supporting the supplementary wings in swingable relation to the principal wings.

9. In a display apparatus, in combination, a series of oscillatory principal display wings normally arranged obliquely in overlapping row relation, supplementary display wings swingably mounted for oscillation at the free margins of the respective principal wings, swingable carriers for respectively supporting the principal wings and their supplementary wings, and means including gear-connected mechanism operable responsively to carrier-actuation for swinging the supplementary wings relatively to the principal wings.

10. A display apparatus comprising, in combination, an upstanding frame, a display carrier mounted for oscillation on the frame, a display-member disposed for rotation on the carrier, and means for rotating the display member relatively to the frame and carrier responsively to swinging actuation of the carrier.

11. A display apparatus comprising, in combination, a swingable display carrier, a display-member disposed for rotation on the carrier, and means including a pulley co-operable with the display-member, and a U-belt engaging the pulley and having its opposite ends fixed with respect to the pivotal axis of the carrier for drawing the belt over the pulley for swinging actuation of the carrier effecting simultaneous actuation of the display member.

12. A display apparatus comprising, in combination, an upstanding frame, a display-carrier mounted for oscillation on the frame, a vertical shaft rotarily mounted on the carrier, display apparatus supported by said shaft, and means for rotating said shaft relatively to the frame and carrier responsively to swinging actuation of the carrier.

13. A display apparatus comprising, in combination, an upstanding frame, a display-carrier, a vertical shaft rotarily mounted on the carrier, and means including a ratchet mechanism for rotating said shaft relatively to the frame and carrier responsive to swinging actuation of the carrier in one direction only.

14. Display apparatus comprising, in combination, a swingable display carrier, a display-member including a principal portion supported by the carrier and a hinged flap portion extending therebeyond, and means on the carrier having engagement with the flap-portion for swinging the same relatively to the principal portion responsively to swinging actuation of the carrier.

15. A display apparatus comprising, in combination, a supporting frame, a swingable display-carrier mounted on the frame, a display member disposed for rotation at an end of the carrier, and means for effecting swingable actuation of the display member responsively to swingable actuation of the carrier, said means including a yoke on the carrier, a connecting rod slidable through the yoke for swivelling on the carrier, a crank on the display member having pivotal connection with one end of said rod, and a member on the frame for pivotally anchoring the other end of the rod.

16. In a display apparatus, in combination, a display chamber, a support, a swingable display carrier mounted on the support and having an anchor-arm overhanging the support and a cantilever-arm projecting into the display chamber, a hold-down member spaced from the support for sliding engagement with the anchor-arm for supporting the cantilever-arm of the carrier in said display chamber, a display-supporting member rotarily mounted on said carrier, and means including a rack on the hold-down member and a carrier supported shaft having geared connection with the rack and the display-supporting member for effecting rotating actuation thereof on swinging actuation of the carrier.

17. Display apparatus comprising, in combination, a support, a carrier pivotally mounted on the support and comprising an arm of inverted channel section having a side flange longitudinally inwardly and upwardly folded therein forming an open-end U-shaped channel, and a display card having an inverted U-shaped hanger for endwise slidingly interfitting said channel for hookwise supporting the card from the carrier.

18. In a display apparatus, in combination, a support, a series of guide-pins upstanding from said support, carriers mounted for oscillation on the support, arms on the carriers overhanging said series of guide-pins, a bar having slots for working over said pins, and a series of lugs on the bar for respectively engaging said carrier-arms.

19. In a display apparatus, in combination, a display chamber, a support, a display carrier mounted on the support for swingable movement and having an anchor arm overhanging the support and a cantilever arm projecting into the display chamber, and means including a member spaced from the support for sliding engagement with the anchor arm for supporting the cantilever arm of the carrier in said display chamber.

20. In a display-apparatus, a supporting-frame, and a wing mounted upon the frame for oscillation, the wing including a main wall and a transparent wall, the latter wall being attached marginally to the main wall in the formation of a container for article-display.

21. In a display-apparatus, in combination, a supporting frame, a wing mounted marginally in the frame for oscillation, and a transparent container mounted on a free margin of the wing for visual display of the contained article.

22. In a display-apparatus, in combination, a supporting frame, a principal wing mounted on a margin in the frame for oscillation, a supplementary wing mounted for oscillation on a free margin of the principal wing, and a transparent container mounted on the supplementary wing for visual display of the contained article.

23. In a display-apparatus, a supporting frame, an arm channeled shaped in cross-section mounted on the frame for oscillation, a wing, and a complementary channeled shaped member on the wing for swingable engagement with the arm for dependingly attaching the wing to the arm for oscillation with the arm relatively to the frame.

24. In a display-apparatus, the combination with a display-chamber, of a wall-forming strip for disposition in the chamber, and spaced display-members hingedly connected to the strip for exposing the intervening portion of the strip when in splayed relation.

25. In a display-apparatus, the combination with a display-chamber, of a row of spaced oscillatory display-members mounted for removal in the chamber and arranged for splaying in pairs sequentially along the row, and a chamber-back wall-forming member also mounted for removal in the chamber and having connection with the display-members for removal therewith as a unit from the chamber.

26. In a display-apparatus, in combination, an upstanding supporting frame, a principal wing mounted on the frame for oscillation in a vertical plane, and a supplementary wing mounted for oscillation on the principal wing.

27. In a display-apparatus, in combination, an upstanding supporting frame, a principal wing mounted on the frame for oscillation in a vertical plane, and a supplementary wing marginally mounted for oscillation on a free margin of the principal wing.

28. In a display-apparatus, in combination, a supporting frame, an arm mounted on the frame for oscillation, a principal wing attached to the arm, and a supplementary wing attached to the arm for oscillation both with, and relatively to, the arm.

29. In a display-apparatus, in combination, a supporting frame, an arm mounted on the frame for oscillation, a principal wing attached to the arm, a supplementary wing attached to the arm for oscillation both with, and relatively to, the arm, and means for swingably actuating the supplementary wing relatively to the arm.

30. In a display-apparatus, in combination, a supporting frame, an arm mounted on the frame for oscillation, a principal wing attached to the arm, a supplementary wing attached to the arm for oscillation both with, and relatively to, the arm, means for oscillating the arm and its attached wings relatively to the frame, and means for swingably actuating the supplementary wing relatively to the arm.

HENRY BASCOM.